Figure 1:
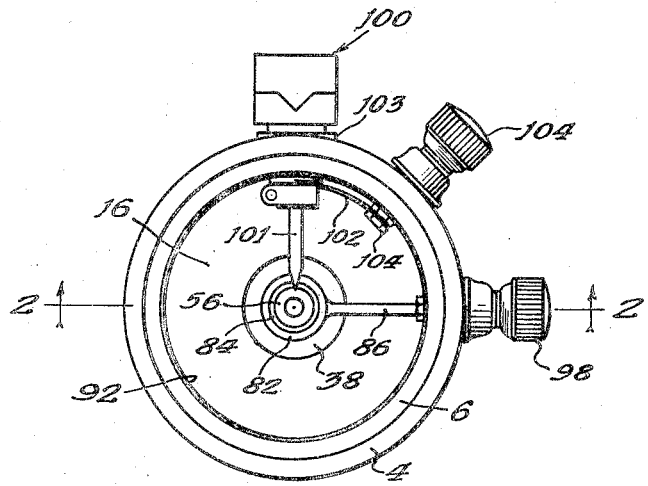

Oct. 4, 1949.  H. PALEVSKY ET AL  2,483,981
DYNAMIC CONDENSER
Filed Sept. 20, 1946  2 Sheets-Sheet 1

Inventors:
Harry Palevsky
Robert K. Swank
By
Attorney

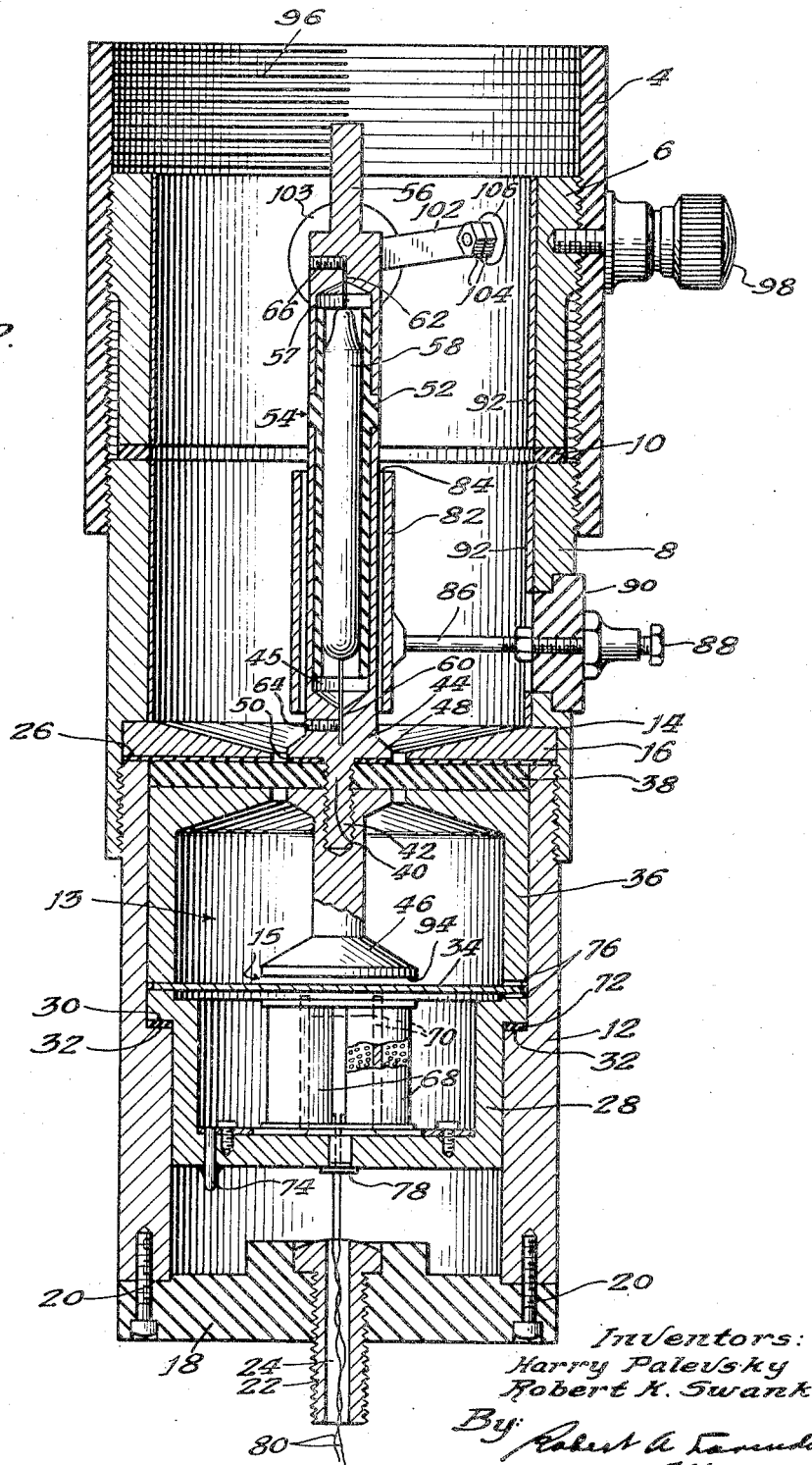

Patented Oct. 4, 1949

2,483,981

UNITED STATES PATENT OFFICE 2,483,981

DYNAMIC CONDENSER

Harry Palevsky, Urbana, and Robert K. Swank, Chicago, Ill., assignors to the United States of America as represented by the United States Atomic Energy Commission Application September 20, 1946, Serial No. 698,362

10 Claims. (Cl. 175—41.5)

This invention relates to an improved electrometer system for the measurement of small electrical potentials and of electrostatic charge. More specifically, this invention relates to an improved dynamic condenser for converting small direct voltages into alternating voltages, and thus facilitating such measurement.

In making a continuous measurement of the electrostatic charge collected, for example, by an ionization chamber over a period of time, it is necessary that the measuring instrument present no path by which the charges of opposite polarity can leak off and thus become neutralized. For this reason direct-current amplifiers cannot be used, since any vacuum tube now known passes sufficient current between grid and cathode to provide a low enough resistive path to make accurate measurement of electrostatic charge by such means impracticable, particularly when coupled with the well-known instabilities of direct-current amplifiers. The same objections to direct-current amplifiers arise in measuring small voltages and currents from sources of extremely high internal resistance. In either case, the measurement requires an electrostatic instrument, an instrument which presents a virtually infinite resistance to direct voltages.

The devices most commonly used in the past for such measurements are instruments in the nature of the electroscope and the quadrant electrometer, wherein the charge is collected on two or more electrodes, at least one of which has some degree of freedom of motion relative to the others, the force caused by the repulsion or attraction of the like or unlike charges (depending on the design of the particular device) thus producing a relative motion which is magnified and measured by means of an optical system. Because of their delicacy and relative instability, these instruments require a skilled technician to install and operate them.

Since the advantage of alternating-current amplifiers over direct-current amplifiers is well known, there have been devised various means of converting direct voltages to alternating voltages for purposes of measurement. By far the most satisfactory of these from the point of high input resistance to the direct voltage or charge under measurement is the dynamic condenser. In this device an electrostatic charge proportional to the direct voltage or charge under measurement is placed on a condenser wherein one of the plates is movable with respect to the other. The movable plate is then caused to oscillate with respect to the fixed plate at a constant frequency, by mechanical or magnetic means. The system is so designed that the charge on the condenser cannot accumulate and leak off quickly enough to follow the variations in capacity so induced; thus the voltage across the condenser varies in a periodic manner and the alternating voltage signal thus induced is amplified in an alternating-current amplifier and measured.

Various electronic systems have been devised for the amplification and measurement of the output signal of dynamic condensers. One such system is described in our co-pending application filed in the United States Patent Office on August 9, 1946, Serial No. 689,480. The present invention is not concerned with such an electronic system, but relates to an improved dynamic condenser which may be used with any suitable electronic system.

It has been found that the dynamic condensers heretofore in use are not satisfactory for sensitive applications such as measuring the charge collected by an ionization chamber in the presence of very weak ionizing radioactivity. Drifts in contact potential between the plates of the dynamic condenser constitute a limit on the sensitivity and stability. Slight changes in the frequency of the source of energy being used to induce oscillation of the mobile plate have caused considerable variation in the amplitude of the oscillation of the plate, when operation is at a frequency in the neighborhood of the resonant frequency of the mechanical system. The relatively large capacitance of previous dynamic condensers has likewise reduced the sensitivity in measuring charge, since the voltage produced by a given charge is inversely proportional to the capacity upon which the charge is placed. Critical adjustment of the spacing between the dynamic condenser plates has been required in assembly and operation. Likewise, great difficulty is experienced with stray electric and magnetic fields, necessitating elaborate shielding of the equipment.

It is, therefore, an object of the present invention to provide a stable dynamic condenser, free of variations of contact potential.

It is a further object of the invention to provide a dynamic condenser the capacitance variation of which is relatively independent of changes in the frequency of the driving source.

A further object of the invention is to provide a dynamic condenser assembly adapted for very sensitive measurements of voltage and charge, yet simple in construction and rugged and reliable in operation.

Further, it is an object of the invention to provide a dynamic condenser assembly adapted to minimize the problems of shielding from stray electric and magnetic fields.

Figure 3:
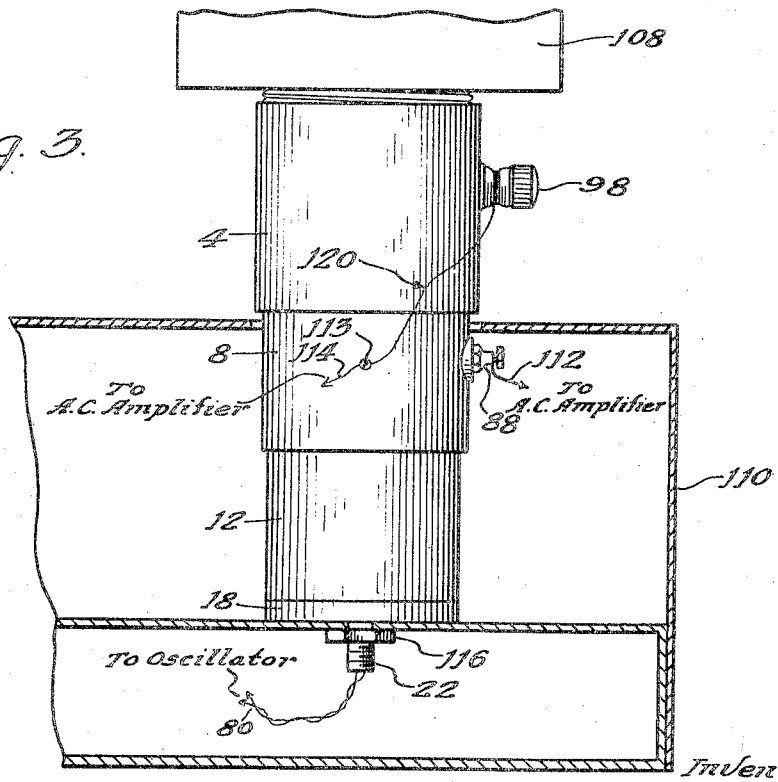

Other aims and objects of the invention will appear from the description below and from the drawing in which:

Figure 1 is a plan view of a vibrating diaphragm dynamic condenser assembly; Figure 2 is an enlarged vertical cross-sectional view, partly in elevation, taken along the line 2—2 of Figure 1; and Figure 3 is a front elevation of the dynamic condenser illustrated in Figures 1 and 2 together with an ionization chamber mounted thereon and the chassis of an electronic circuit, the latter being shown in cross-section.

Referring first to Figures 1 and 2 an internally threaded plastic tube 4, preferably formed of methyl methacrylate polymer, commonly called "Lucite," joins in end-to-end relationship externally threaded tubes 6 and 8 of metal, preferably aluminum. Separating the ends of tube 6 and tube 8 is an annular polystyrene insulator 10. The tube 8 is internally threaded at the bottom portion thereof and is thus joined to the externally threaded tubular housing 12 of the gas-tight chamber 13 which contains the dynamic condenser 15. The tube 8 has at the bottom portion thereof an internal shoulder 14 adapted to receive an annular spacer 16 of brass.

On the under side of the brass spacer 16 is an annular rubber gasket 26 which gasket 26 is compressed between the spacer 16 and the housing 12 when the tube 8 is tightened upon the housing 12. A cup-shaped cavity is defined by an iron container 28. This container has a shoulder portion 30 adapted to rest upon a similar shoulder portion 32 of the housing 12. Across the top of the container 28 is a magnetic diaphragm 34 of the type generally used in telephone receivers. Resting on the periphery of the diaphragm 34 is a brass spacer 36, upon which rests a polystyrene disc-shaped insulator 38.

The polystyrene insulator 38 has drilled through the center thereof a hole 40. Through this hole 40 extends a threaded shaft 42 which constitutes an extension of the brass rod 44 hereafter to be described. The rod 44 has a flanged portion 48 at the bottom thereof. An anvil-shaped brass electrode 46, the upper portion of which is internally threaded to receive the threaded shaft 42, is fastened thereon and the polystyrene insulator 38 thus supports the electrode 46 and the rod 44.

In assembling the rod 44, insulator 38, and electrode 46 marring of the insulator 38 by rotation of the rod 44, which is preferably of brass, is prevented by a rubber gasket 50 which is sandwiched between the lower portion 48 of the rod 44 and the polystyrene insulator 38.

The rod 44 has a cup-shaped cavity 45 therein, adapted to receive in tight-fitting fashion a polystyrene sleeve 52, which has a collar portion 54 adapted to rest upon the upper edge of the cup-shaped cavity 45 in rod 44. A similar rod 56 has a similar cup-shaped cavity 57 and is adapted to fit tightly over polystyrene sleeve 52 and rest upon the collar portion 54. A resistor 58 of the glass-enclosed type, for example $10^9$ ohms, fits axially into the sleeve 52.

In assembly of this portion the resistor 58 is inserted into the sleeve 52. The wire terminals 60 and 62 of the resistor 58 protrude from the ends of the sleeve 52. The sleeve 52 is then forced into the cavity 45 in the rod 44. At the lower end of the cavity 45 in the rod 44 is a hole adapted to receive the wire terminal 60 of the resistor 58. Secure electrical contact of the terminal 60 to the rod 44 is attained by set screw 64. The cavity 57 of the rod 56 is then forced over the sleeve 52. Electrical contact between the wire terminal 62 of resistor 58 and the rod 56 is secured by set screw 66.

Within the iron container 28 mentioned above are mounted coils 68 having iron cores 70. The coils 68 are of the type commonly used in telephone receivers. The spacer 36, preferably of brass, defines the distance between the polystyrene insulator 38 and the diaphragm 34 and thus defines the distance between the diaphragm 34 and the electrode 46. The chamber 13 is formed as above described by the iron container 28, the brass spacer 36, and the polystyrene insulator 38, said chamber 13 containing the electrode 46, the diaphragm 34, and the coils 68. This chamber is made vacuum-tight by means of the rubber gasket 26, which is sandwiched between brass spacer 16 and housing 12, the rubber gasket 50, and an additional rubber gasket 72, which is sandwiched between the collar portions 30 and 32 of container 28 and housing 12 respectively. The bottom of the container 28 has a Kovar-glass seal 74 extending through a hole therein to permit evacuation and gas filling of the chamber 13.

The bottom of the housing 12 is covered by a Bakelite base 18 which is secured thereto by screws 20. The heads of screws 20 do not extend beyond the bottom surface of the covering 18.

Through the center of the covering 18 extends a brass bolt 22 having a hole 24 drilled axially therethrough. The bottom of the container 28 likewise contains an additional hole and Kovar-glass seal 78 for the purpose of making a vacuum tight electrical connection to the coils 68. The leads 80 to the coils 68 extend out through the seal 78 through the hole 24 in bolt 22. The chamber 13 is filled with argon. In order to allow evacuation and gas filling of the upper part of the chamber 13 containing the electrode 46, axial notches 76 are cut in the upper surface of the container 28 and the lower surface of the spacer 36, so that the upper and lower portions of the chamber 13 will not be sealed from each other by compression of the periphery of the diaphragm 34.

A brass tube 82 surrounds the rod 44 with an air gap 84 between the rod 44 and the tube 82. The tube 82 is supported by a shaft 86 which is soldered thereto and which is connected to a binding-post 88. The binding-post is in turn supported by a polystyrene insulating insert 90 in the wall of tube 8. The insert 90 thus electrically insulates the binding-post 88 from the tube 8. Tubes 6 and 8, which are preferably of aluminum, are lined with brass liners 92.

The physical construction of the dynamic condenser assembly having thus been described, the operation and advantages may now be set forth. Suppose that a direct voltage potential is impressed between rod 56 and housing 12, the polarity being such that the positive potential is connected to rod 56. Then positive charge flows through rod 56, terminal 62, resistor 58, terminal 60 and rod 44 onto electrode 46. Negative charge flows directly onto diaphragm 34. The flow of charge continues until the full applied voltage appears between electrode 46 and diaphragm 34, which thus constitute the plates of a condenser 15. If an alternating current is now caused to flow through coils 68 by means of leads 80 the distance between the center of diaphragm 34 and the lower face 94 of electrode 46, and thus the capacitance between these plates, varies at the frequency of the applied coil current. The resistor 58 is sufficiently high in resistance value, for example $10^9$ ohms, so that the charge cannot leak off the electrode 46 back to the source of impressed voltage. It is well-known that with a constant charge the voltage across the condenser 15 varies inversely with the capacitance. Therefore, the constant charge thus produced on the condenser 15 consisting of electrode 46 and diaphragm 34 produces an alternating voltage across said condenser 15 when the diaphragm 34 is so caused to oscillate.

As is well-known in the art the diaphragm 34 will oscillate with maximum amplitude, and thus with maximum capacity variation, when the current through coils 68 is of the same frequency as the mechanical resonant frequency of the diaphragm 34. In dynamic condensers heretofore used, the mobile plate has been driven directly from a power line source, usually 60 cycles. The difficulty that is experienced with such a system is that the frequency of oscillation of the mobile plate, and thus the frequency of the alternating voltage output of the dynamic condenser, is the same as the power line frequency; thus strong electrical and magnetic fields of the same frequency as the signal under measurement are present and render sensitive detection difficult. In the present invention the frequency to which the diaphragm 34 is resonant is greater than 200 cycles per second, for example a thousand cycles per second, which is much higher than the frequency of any power line likely to be employed, and thus the problem of discriminating against stray electrical and magnetic fields is minimized.

A problem that is frequently encountered in driving a vibrating element at its resonant frequency is that any change in the frequency of the energy source driving the vibrating element will cause a considerable change in the amplitude of vibration. The present invention minimizes this difficulty by enclosing the electrodes of the condenser 15 in a gas-tight chamber 13. The gas in the chamber 13 acts to damp the mechanical vibrations of the diaphragm 34 and thus to render its resonance characteristics much less critical than they would be in free space or in a vacuum.

It will be noted that contact potentials between electrode 46 and diaphragm 34 will produce an alternating voltage signal. In order to make possible the accurate measurement of very small voltages it is necessary to minimize and preferably to eliminate contact potential differences between the diaphragm 34 and the electrode 46. There is at present no known satisfactory way of matching two pieces of metal so as to minimize contact potentials. The most satisfactory method of eliminating this effect is to coat uniformly with gold the lower surface 94 of the electrode 46 and the upper surface of the diaphragm 34. The coating is done by evaporation, both coatings being made simultaneously in the same coating apparatus. Pure gold is used for the coating because it has been found that the contact potential between gold surfaces is smaller and more stable than that of surfaces coated with any other material. Another reason for the selection of gold is that it is relatively inert to the atmosphere, thus assuring that the minimum contact potential thereby established will remain stable. For the same reason an inert gas, preferably argon, is used as the filling for the chamber 13 containing the electrode 46 and the diaphragm 34.

The tubes 6 and 8 and the housing 12 are preferably of aluminum to make the assembly light in weight. The rods 44 and 56 and the electrode 46 are preferably of brass for purposes of ease of cleaning and machinability. The liners 92 of brass are inserted so as to prevent any detrimental effect of contact potential between the tubes 6 and 8 and the rods 44 and 56.

The rod 44 and the tubing 82 constitute the electrodes of an output coupling condenser separated by the air gap 84. The output alternating voltage signal thus appears between binding-post 88 and housing 12. The upper plastic tube 4 has an internally threaded portion 96 which is adapted to receive an externally threaded ionization chamber. A binding-post 98 is screwed into the upper collar 6 in order to make convenient electrical connection thereto. The polystyrene insulator 10 together with the plastic tube 4 serve to provide an insulating assembly so that aluminum tube 6 may be operated at a different potential from the potential of tube 8 and housing 12.

A switch 100 consisting of a metal rod 101 (Fig. 1) adapted to move radially in the tube 6, insulated therefrom by an insulator 103, is connected by a shorting bar 102 to a binding-post 104 which is mounted on the upper tube 6 by an insulator 106 (Fig. 2). The rod 56 may thus be shorted to the binding-post 104 which may be in turn connected to ground or to any other point. The arrangement of binding-posts and the shorting switch make the dynamic condenser assembly illustrated in the drawing adaptable to be used with a wide variety of electronic circuits and with a wide variety of voltage and charge sources under measurement. The insulating cover 18 serves to insulate the housing 12 from any support on which the assembly may be mounted, as illustrated in Figure 3 and described below. Thus either side of both input circuit and output circuit may be grounded or ungrounded as may be desired.

In Figure 3 is an illustration of a typical installation of the dynamic condenser illustrated in Figures 1 and 2. An ionization chamber 108, illustrated fragmentarily because it constitutes no part of this invention, is mounted on the dynamic condenser assembly. The lower portion of the assembly is contained within a metal chassis 110 containing an appropriate electronic circuit (not shown in the drawing). The chassis 110 serves as a shield for the leads 112 and 114 which transmit the alternating voltage output signal to an alternating current amplifier, the lead 112 being connected to the binding-post 88, and the lead 114 being connected to the tube 8 and thus the housing 12 by the screw 113. The housing 12 is likewise connected to the binding-post 98 by a jumper 120. The dynamic condenser assembly is mounted by means of the bolt 22 and a nut 116. The coil leads 80 are connected to an electronic oscillator which likewise constitutes no part of this invention and is therefore not illustrated.

The teachings of the invention as disclosed herein should not be considered to be limited by the embodiment illustrated in the drawing and described above. Persons skilled in the art will find many equivalent applications of the discoveries of the present invention.

What is claimed is:

1. In a dynamic condenser system for converting electrostatic charge to alternating voltage having a fixed conducting electrode, a mobile conducting electrode, and means coupled to the mobile electrode to vary the distance between said electrodes at a fixed frequency, the improvement comprising the combination therewith of a gas-tight housing, supporting means adapted to support said electrodes within said housing, and a gaseous filling within said housing, whereby the effect of changes in the frequency of said distance-varying means upon the amplitude of the distance variation is reduced.

2. A dynamic condenser comprising the combination of claim 1 wherein said gaseous filling consists of an inert gas.

3. A dynamic condenser comprising the combination of claim 1 wherein said gaseous filling consists of argon.

4. In a dynamic condenser system for converting electrostatic charge to alternating voltage having a fixed electrode, a mobile electrode and driving means coupled to said mobile electrode to vary the distance between said electrodes, the improved construction wherein the adjacent surfaces of each of said electrodes are coated with a single conducting substance which is stable with respect to the atmosphere.

5. A dynamic condenser comprising the combination of claim 4 wherein said substance is gold.

6. The apparatus of claim 4 wherein said adjacent surface coatings are co-deposited.

7. The apparatus of claim 4 wherein said adjacent surfaces are coated with co-deposited layers of gold.

8. A dynamic condenser system for converting electrostatic charge to alternating voltage comprising a gas-tight chamber substantially filled with inert gas, spaced electrodes within said chamber, and means for moving at least one of said electrodes toward and away from the other at a fixed frequency.

9. A dynamic condenser according to claim 8, wherein the adjacent surfaces of the electrodes are formed of substantially pure gold.

10. A dynamic condenser system for converting electrostatic charge to alternating voltage comprising a chamber filled with inert gas and a plurality of spaced electrodes in said chamber, the adjacent surfaces of said electrodes being formed of co-deposited gold layers, and means for cyclically varying the distance between said electrodes at a fixed frequency.

HARRY PALEVSKY.
ROBERT K. SWANK.

REFERENCES CITED

The following references are of record in the file of this patent:

UNITED STATES PATENTS

| Number | Name | Date |
|---|---|---|
| 1,972,964 | Wolcott | Sept. 11, 1934 |
| 1,978,600 | Polydoroff | Oct. 30, 1934 |
| 2,001,096 | Flanders | May 14, 1935 |
| 2,042,490 | Zahl | June 2, 1936 |
| 2,115,143 | Harrison | Apr. 26, 1938 |
| 2,115,578 | Hall | Apr. 26, 1938 |
| 2,234,328 | Wolff | Mar. 11, 1941 |
| 2,309,081 | Priessman et al. | Jan. 26, 1943 |
| 2,326,074 | Slepian | Aug. 3, 1943 |